US009284696B2

(12) United States Patent
Fischer et al.

(10) Patent No.: US 9,284,696 B2
(45) Date of Patent: Mar. 15, 2016

(54) COMPACTOR ROLLER FOR A SOIL COMPACTOR

(71) Applicant: HAMM AG, Tirschenreuth (DE)

(72) Inventors: Richard Fischer, Bärnau (DE); Günter Kolberg, Weiden (DE); Günter Rath, Immenreuth (DE); Josef Dagner, Altenstadt/Wn (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 14/372,031

(22) PCT Filed: Jan. 31, 2013

(86) PCT No.: PCT/EP2013/051902
§ 371 (c)(1),
(2) Date: Jul. 14, 2014

(87) PCT Pub. No.: WO2013/113819
PCT Pub. Date: Aug. 8, 2013

(65) Prior Publication Data
US 2015/0211195 A1    Jul. 30, 2015

(30) Foreign Application Priority Data
Feb. 1, 2012  (DE) .......................... 10 2012 201 443

(51) Int. Cl.
E01C 19/28   (2006.01)
E01C 19/23   (2006.01)
A01B 29/06   (2006.01)

(52) U.S. Cl.
CPC ................ *E01C 19/28* (2013.01); *A01B 29/06* (2013.01); *E01C 19/23* (2013.01); *E01C 19/286* (2013.01)

(58) Field of Classification Search
CPC ..... E01C 19/006; E01C 19/26; E01C 19/288; E01C 19/28; E01C 19/23; E01C 19/286; E02D 1/022; E02D 3/026; E02D 3/039
USPC .......................................... 404/121, 124, 122
See application file for complete search history.

(56) References Cited

U.S. PATENT DOCUMENTS 3,783,701 A * 1/1974 Steprath et al. .................... 74/87
4,176,983 A * 12/1979 Gardner ........................ 404/117
(Continued)

FOREIGN PATENT DOCUMENTS

CN    2525116 Y   12/2002
CN    1407179 A1   4/2003
(Continued)

OTHER PUBLICATIONS

Sakai, Translation of JP2004263486, Sep. 24, 2004.*
(Continued)

Primary Examiner — Abigail A Risic
(74) Attorney, Agent, or Firm — Rothwell, Figg, Ernst & Manbeck, P.C.

(57) ABSTRACT

A compactor roller for a soil compactor comprises an oscillation mass assembly (34) including at least one oscillation shaft (36) rotatable about an oscillation-shaft axis of rotation eccentric to a compactor-roller axis of rotation, which oscillation mass assembly (34) includes at least one oscillation unbalance mass (66, 68), and a vibration mass assembly (84) including a vibration shaft (86) rotatable about a vibration shaft axis of rotation ($D_v$), which vibration mass assembly (84) includes at least one vibration unbalance mass (96), wherein at least one oscillation shaft (36, 38) and the vibration shaft (86) are carried in the compactor roller (10) such that they can be driven to rotate.

21 Claims, 5 Drawing Sheets

(56) References Cited

U.S. PATENT DOCUMENTS

| | | | |
|---|---|---|---|
| 2004/0120767 A1* | 6/2004 | Potts et al. | 404/117 |
| 2004/0168531 A1* | 9/2004 | Mitsui | 74/86 |
| 2006/0034659 A1* | 2/2006 | Magee | 404/117 |
| 2012/0301221 A1 | 11/2012 | Ackermann et al. | |

FOREIGN PATENT DOCUMENTS

| | | |
|---|---|---|
| CN | 201753426 U | 3/2011 |
| DE | 1212004 A | 3/1966 |
| DE | 29805361 U1 | 7/1998 |
| DE | 202010005962 U1 | 11/2010 |
| EP | 0053598 B1 | 9/1984 |
| JP | 2004263486 A | 9/2004 |

OTHER PUBLICATIONS

International Search Report from PCT/EP2013/051902, dated Apr. 3, 2013, 2 pages.

German Search Report from DE 102012201443.8, dated Jan. 10, 2013, 5 pages.

\* cited by examiner

COMPACTOR ROLLER FOR A SOIL COMPACTOR

CROSS REFERENCE TO RELATED APPLICATION(S)

This application is a 35 U.S.C. §371 National Phase Entry Application from PCT/EP2013/051902 filed Jan. 31, 2013, and also claims priority to German patent application no. DE 10 2012 201 443.8 filed on Feb. 1, 2012. The above-identified applications are incorporated herein by reference in their entirety.

DESCRIPTION

The present invention relates to a compactor roller for a soil compactor, preferably a self-propelled soil compactor, such as can be used in road construction or landscaping for the compressing of soil material, such as e.g. gravel, earth, asphalt or similar. A soil compactor of this type generally comprises at least one compactor roller, using which the soil compactor moves over the soil material to be compacted and compacts it under the influence of gravitational force. In order to be able to improve the compaction result, it is known to set the compactor roller oscillating. An oscillation state of this type is a state of vibration, i.e. a state, wherein the compactor roller is excited to a periodic deflection movement radial to its compactor-roller axis of rotation, in particular a periodic upward and downward movement substantially in the vertical direction. Another oscillation state is an oscillation movement wherein a compactor roller is excited to a back-and-forth movement in the circumferential direction about its compactor-roller axis of rotation.

A soil compactor including a compactor roller is known from EP 0 053 598 B1 which can be switched with respect to its oscillation-excitement state between an oscillation movement and a vibration movement. For this purpose two unbalance shafts eccentric to the compactor roller axis of rotation and extending parallel thereto are provided in the interior of the compactor roller. These are driven by a drive motor and a drive shaft which is coaxial to the compactor-roller axis of rotation via respective belt drives to rotate in the same direction of rotation. Two unbalance masses are provided on each unbalance shaft, for example axially spaced apart. In order to be able to switch between the different oscillation-excitement states, i.e. a vibration movement and an oscillation movement, the unbalance masses on one of the unbalance shafts are provided as fixed, while with the other unbalance shaft, the unbalance masses provided thereon can move about their axis of rotation within an angular range of 180° with respect to the associated unbalance shaft. By reversing the direction of rotation of the unbalance shaft the phase positions of the unbalance masses provided on the different unbalance shafts can thus be shifted with respect to one another so that depending on the direction, the system can be used for generating a vibration movement, i.e. a radial movement with respect to the compactor-roller axis of rotation, or for generating an oscillation movement, i.e. a circumferential movement about the compactor roller axis of rotation, wherein of course each of these movements is carried out periodically with a frequency provided therefor.

It is the object of the present invention to provide a compactor roller for a soil compactor, using which compactor roller an improved compaction result can be achieved.

This object is inventively achieved by a compactor roller for a soil compactor, said compactor roller comprising an oscillation-mass assembly including at least one oscillation shaft which is rotatable about an oscillation-shaft axis of rotation which is eccentric to a compactor-roller axis of rotation, said oscillation shaft including at least one oscillation-unbalance mass, and a vibration shaft which is rotatable about a vibration-shaft axis of rotation, which vibration shaft includes at least one vibration-unbalance mass. For generation of periodic oscillations or vibrations having the respective desired or advantageous frequency therefor, at least one oscillation shaft and the vibration shaft are drivably carried to rotate in the compactor roller.

As suited to the requirements, different oscillation states, i.e. both an oscillation movement and a vibration movement can also be induced in the inventively-formed compactor roller, however using assemblies which are formed independently from each other and optionally also independently drivable, namely the oscillation-mass assembly on the one hand and the vibration-mass assembly on the other hand. It is thus possible to be able to optimally design each of these mass assemblies independently of the other mass assembly with respect to the oscillation movement or oscillation excitement to be induced thereby. A state can thus be avoided wherein the unbalance present in the compactor roller for an oscillation state of oscillation movement and vibration movement has too low a mass or as the case may be also an unsuitable natural frequency, while it has too high a mass and possibly likewise an unsuitable natural frequency for the other oscillation state of oscillation movement and vibration movement.

For the efficient transmission to the compactor roller of the vibrations generated by the vibration-mass assembly, it is suggested that the vibration-shaft axis of rotation be substantially concentric with the compactor-roller axis of rotation.

In order to be able to use the space available in the interior of a compactor roller in the most efficient manner possible, it is suggested that the oscillation-shaft axis of rotation of at least one of the oscillation shafts be substantially parallel to the vibration-shaft axis of rotation or/and to the compactor-roller axis of rotation.

Since the vibration shaft and at least one oscillation shaft, preferably all oscillation shafts, are drivably carried to rotate inside the compactor roller, during rotation of the vibration shaft and the oscillation shafts about their respective axes of rotation, a rotational movement resulting from the rotation of the compactor roller about its compactor-roller axis of rotation is superimposed. This leads to a shift in the rotational speed, in particular of the oscillation shaft, with the danger that the generally intended agreement between the rotational movement of the vibration shaft and the rotational movement of the oscillation shafts is impaired or lost. In order to prevent this, a shaft drive for driving at least one oscillation shaft for rotation about its oscillation-shaft axis of rotation can be provided, wherein the shaft drive comprises a drive motor and a transmission drive assembly, wherein a rotational speed translation ratio of the transmission drive assembly varies depending on a rotational speed of the compactor roller about the compactor-roller axis of rotation. With this design, a matching of the rotational speed of the one or all oscillation shafts can be achieved by the changing of the transmission drive assembly depending on the rotational speed of the compactor roller, so that an intended agreement between the rotational movement of the oscillation shafts on the one hand and the compactor shaft on the other hand can be maintained independent of the rotational state of the compactor roller itself.

Here it is particularly advantageous if, when the compactor roller is not rotating about the compactor-roller axis of rotation, a rotational speed translation ratio of the transmission drive assembly is 2:1. In this way it can be taken into account that an oscillation period of an oscillation movement of the compactor roller in principle comprises a back and a forth-movement of the compactor roller, substantially in the horizontal direction. During this back-and-forth movement it is advantageous if the vibration shaft passes through two periods: one for the back-oscillation movement and one for the forth-oscillation movement. It is thus possible to use the same drive motor for the drive of the vibration shaft and the drive of the one or of each oscillation shaft. Due to rotational speed reduction which is preset in principle to the ratio 2:1 for the oscillation shafts, an agreement of this type can in principle be preset, so that the vibration shaft rotates at double the rotational speed of the one or each oscillation shaft. Based on this initial rotational speed translation ratio, a variation of the rotational speed translation ratio which occurs in a manner dependent on the rotational speed of the compactor roller can be performed in order to compensate for the superposition effect described above.

Since this superposition effect depends on which direction the compactor roller rotates about its compactor-roller axis, it is further suggested that during rotating of the compactor roller in a first direction of rotation, the rotational speed translation ratio of the transmission drive assembly is elevated with respect to an initial rotational speed translation ratio with the compactor roller not turning about the compactor-roller axis of rotation, and during turning of the compactor roller in a second direction opposing the first direction of rotation, the rotational speed translation ratio of the transmission drive assembly is reduced with respect to the initial rotational speed translation ratio.

A design of the transmission drive assembly which is very stable and permits, in a simple manner, the variation of the rotational speed translation ratio in a manner which depends on the rotational speed of the compactor roller can comprise a planetary transmission, preferably having three planetary transmission units, each having a sun gear, ring gear, and planetary gears in comb engagement therewith on a planetary gear carrier, said planetary transmission having a transmission input shaft and a transmission output shaft.

For coupling of the one or of each oscillation shaft to the transmission output shaft of the planetary transmission, it is suggested that the transmission drive assembly comprise, in association respectively with each oscillation shaft, a belt drive having a drive pulley which is drivable to rotate by the transmission output shaft, and a driven pulley driving the oscillation shaft to rotate, and at least one transmission belt, wherein preferably a rotational speed translation ratio of each belt is 2:1. If the design is chosen such that the rotational speed translation ratio of the drive belt is 2:1, the above-described rotational speed translation ratio of the transmission drive assembly of 2:1 is in principle achieved solely by the configuration of the drive belt. This means that the planetary transmission can be designed such that with a compactor roller which is not rotating about the compactor-roller axis of rotation, the planetary transmission provides a rotational speed translation ratio of 1:1, which thus rotates the transmission output shaft with the same rotational speed as the transmission input shaft.

For introducing the drive torque via the driveshaft, the planetary transmission can comprise a first planetary transmission unit including a first sun gear which is connected to the transmission input shaft so that they rotate together, a first ring gear which is disposed in a rotationally-fixed manner, and a first planetary gear which is rotatably carried on a first planetary gear carrier.

For delivery of a torque from the planetary transmission, this can further comprise a second planetary transmission unit including a second sun gear rotationally fixed on the transmission output shaft, a second ring gear, and a second planetary gear which is rotatably carried on a second planetary gear carrier.

In order to be able to realize a torque-transmission connection between the first planetary transmission unit and the second planetary transmission unit, it is suggested that the first planetary gear carrier and the second planetary gear carrier be provided by a common planetary gear carrier of the first planetary transmission unit and the second planetary transmission unit.

In order to be able to vary the rotational speed translation ratio of the planetary transmission depending on the rotational state of the compactor roller, it is further suggested that the third planetary transmission unit of the planetary transmission comprises a third sun gear rotationally fixed on the compactor roller, a third sun gear, a third ring gear, and rotatably carried third planetary gears arranged on a third planetary gear carrier, said third planetary gear carrier being disposed in a rotationally-fixed manner.

In this way a retroactive effect on the torque transmission state between the first planetary transmission unit and the second planetary transmission unit can be achieved in that the second ring gear and the third ring gear are rotationally fixed with respect to each other, or/and that the first ring gear and the third planetary gear carrier are rotationally fixed with respect to each other.

According to a particularly advantageous aspect of the above-described design, it is proposed that the transmission input shaft and the vibration shaft are coupled for common rotation, wherein preferably these two shafts can be positioned coaxially with respect to each other and also coaxial to the compactor-roller axis of rotation. This means that the vibration shaft rotates in principle with the same rotational speed as the transmission input shaft, and taking into account the above-described initial rotational speed translation ratio of the transmission drive assembly of 2:1, it can be ensured that the one or each oscillation shaft rotates at half the rotational speed of the vibration shaft. Furthermore, to obtain a compact design of the transmission output shaft, the transmission input shaft can be disposed coaxially surrounding it.

With the above-described design, a synchronization of the rotational movements of the oscillation shafts and the rotational movements of the vibration shaft can be achieved in a simple manner, and in particular with inclusion of the rotation of the compactor roller, in particular if both the drive torque for the one or both oscillation shafts as well as for the vibration shafts are provided via the transmission input shaft. In order to be able to generate oscillations and vibrations independently of each other, in an alternative design it can be provided that at least one oscillation shaft and the vibration shaft are drivable to rotate independently of each other. For this purpose it can be provided that a drive shaft be associated with at least one oscillation shaft and the vibration shaft. Also with such a design, a defined matching of the rotational movements of the vibration shaft on the one hand and the oscillation shafts on the other hand can be maintained, also taking into account the rotational state of the compactor roller itself, wherein for example the rotational speed of the compactor roller can be recorded or determined, and then it can be provided, using control technology with the respective shaft drives, that the above-described matching of the rotational states of the compactor shaft or the oscillation shafts is maintained.

An efficient introduction of the oscillations into the compactor roller can be achieved by having two oscillation shafts preferably provided with an angular displacement of approximately 180° with respect to the compactor-shaft axis of rotation. Here the oscillation shafts are advantageously drivable as rotating in the same direction of rotation about their respective oscillation-shaft axes of rotation.

Going beyond the variation of the respective rotational speed that has been specified here for a respective shaft, the oscillation behavior or vibration behavior can be influenced such that at least one oscillation unbalance mass or/and at least one vibration unbalance mass has an unbalance which varies depending on the direction of rotation about the associated axis of rotation.

A variation of this type of the unbalance can be achieved in a simple manner in that the at least one unbalance mass comprises a base unbalance mass carried on the associated shaft so that it rotates together with the shaft, and at least one variation unbalance mass which is relocatable within a limited angular range in the circumferential direction about the associated axis of rotation. Here it is advantageously provided that movement stops limiting the circumferential movement about the associated axis of rotation with respect to the base unbalance mass are associated with the at least one variation unbalance mass.

In order to be able to use as efficiently as possible the effect of the provision of a changeable oscillation behavior, said effect being generated by the variation of the unbalance, but nevertheless ensure that the respective oscillation state, i.e. oscillation or vibration, is maintained, it is suggested that each oscillation unbalance mass or/and each vibration unbalance mass be formed using a base unbalance mass and a variation unbalance mass.

The invention further relates to a soil compactor comprising at least one inventively formed compactor roller which is rotatable about a compactor-roller axis of rotation.

The present invention is described below with reference to the accompanying Figures.

Figure 1:
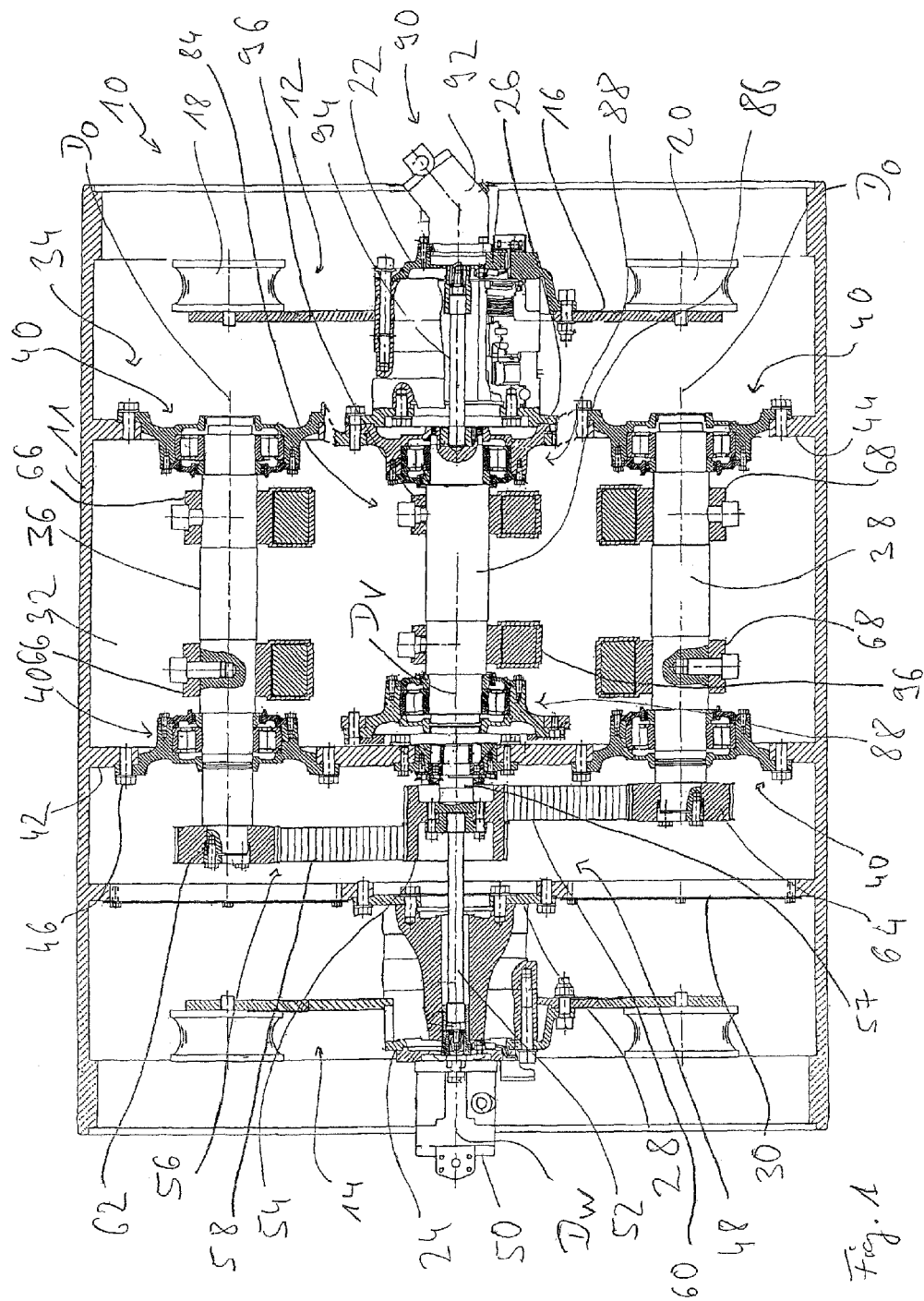
FIG. 1 shows a sectional view of a compactor roller for a soil compactor, cut along a compactor-roller axis of rotation.

In FIG. 1 a compactor roller, generally indicated with the reference number 10, for a preferably self-propelled soil compactor is shown cut along a compactor-roller axis of rotation $D_w$. The compactor roller 10 comprises a roller casing 11 which is rotatably carried about the compactor roller axis of rotation $D_w$ on a compactor framework on both axial end sides via carrier formations 12, 14 positioned engaging in these axial end sides. Each carrier formation 12, 14 comprises a plate-like carrier 16 and a plurality of elastic, for example formed from rubber material, suspension elements 18, 20 fixed thereon which are to be fixed to the not-illustrated compactor framework. In this manner the entire compactor roller 10 is carried on the compactor framework elastically and thus also in a shock- and oscillation-absorbing manner.

A drive motor 22, 24, formed as a hollow motor, for the compactor roller 10 is carried in a fixed manner on each of the carrier formations 12, 14. The two drive motors 22, 24, which can for example be formed as hydraulic motors, each including an output element 26, 28 which is rotatable about the compactor-roller axis of rotation $D_w$, said output element 26, 28 carrying or being connected to the roller casing 11 via, for example, suspension elements 30 which are also elastically formed, as illustrated for example in the context of the drive motor 24 positioned left-side in FIG. 1.

In the interior 32 of the compactor roller 10, said interior 32 being enclosed by the roller housing 11, an oscillation mass assembly, generally indicated by 34, is provided axially between the two carrier formations 12, 14. In the illustrated example the oscillation mass assembly 34 comprises two oscillation shafts 36, 38 which are disposed at an angular separation of 180° to each other with respect to the compactor-roller axis of rotation $D_w$. These are rotatably carried, on regions which are axially spaced with respect to each other, preferably each near their axial end regions, via respective bearing assemblies 40 on the compactor roller 10 about respective oscillation-shaft axes of rotation $D_o$. For this purpose, respective plate-like carriers 42, 44 can be disposed fixed in an axial spacing with respect to the compactor-roller axis of rotation $D_w$, for example in the interior of the compactor roller 10 and by welding on the roller casing 11. Recesses or openings or gaps can be formed in these carriers 42, 44 wherein the bearing assemblies 40 can be positioned in an engaging manner. The fixing of the bearing assemblies 40 on these carriers 42, 44 can for example be effected using screw bolts 46. Here the positioning of the two oscillation shafts 36, 38 is such that their oscillation-shaft axes of rotation $D_o$ lie parallel to each other and also to the compactor-roller axis of rotation $D_w$.

A shaft drive for the oscillation shafts 36, 38, said shaft drive being generally indicated by 48, comprises a drive motor 50 which is carried for example on the drive motor 24 for the compactor roller 10, said drive motor 24 being formed as a hollow motor. A drive shaft 52 of this drive motor 50 penetrates the drive motor 24 for the compactor roller 10, preferably coaxial to the compactor-roller axis of rotation $D_w$, and is connected, for example by screwing or clamping, in its region axially protruding over the output element 28 of the drive motor 24 to a drive-disk formation 54 of a belt drive 56 of the shaft drive 48. The drive shaft 52 can for example be rotatably supported on the carrier 42 by intermediate bearing of a rolling-element bearing or similar via a bearing pin 57 coupled to this drive disk formation 54.

The drive disk formation 54 is for example formed with toothing on its outer circumference and interacts with two axially adjacent drive belts guided around this drive disk formation 54. These drive belts 58, 60 are guided at their respective radial outer end regions around respective drive disks 62, 64 which are also formed with toothing. These drive disks 62 are fixed on the oscillation shafts 36, 38 for example by screwing in an end region protruding over a respective bearing assembly 40.

Figure 2:
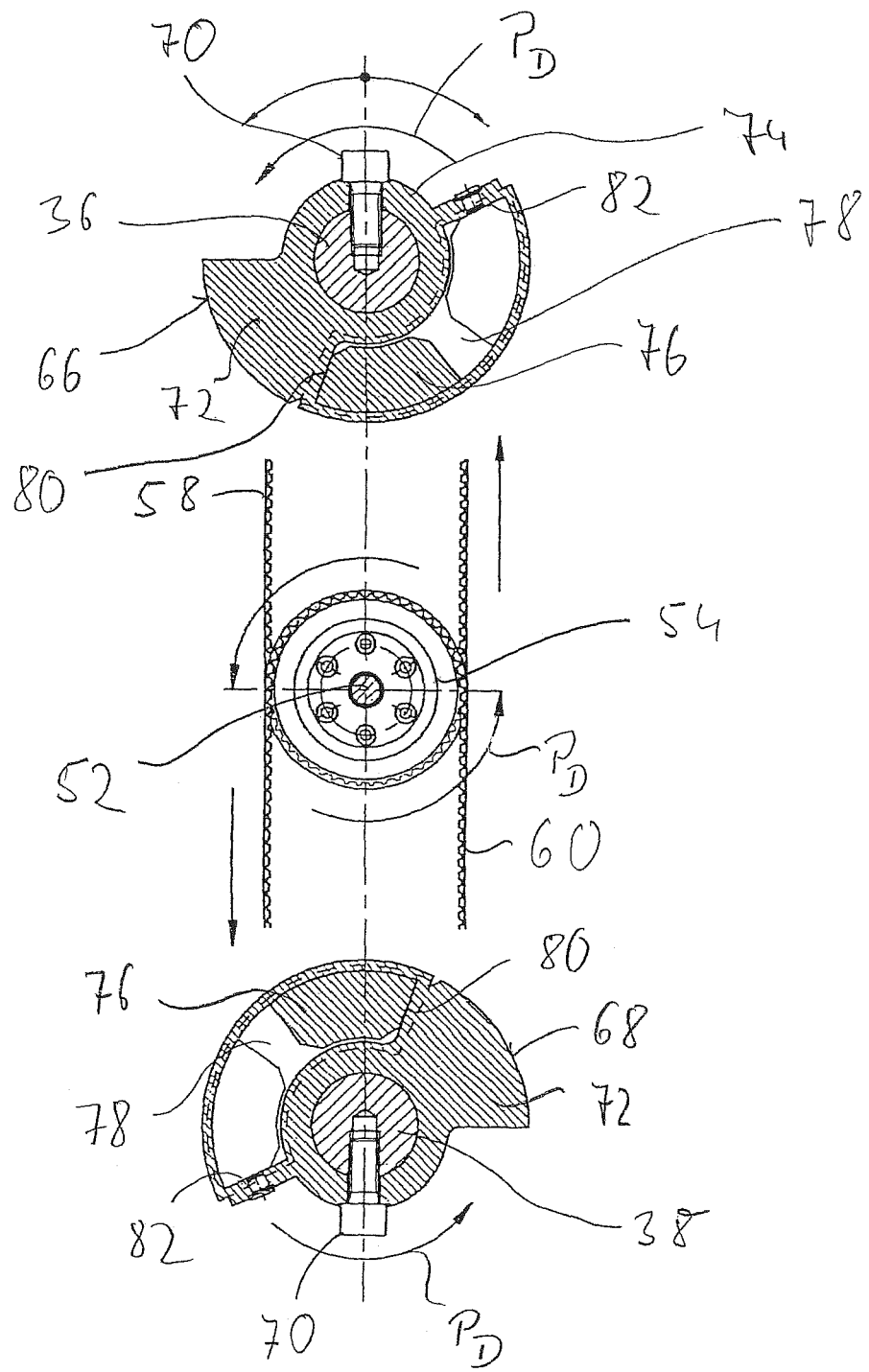
FIG. 2 shows an axial view of an oscillation mass assembly.

As shown in FIG. 2, the symmetric arrangement of the drive belts 58, 60 about the respective axes of rotation $D_w$ or $D_o$ leads to the two oscillation shafts 36, 38 turning in directions of rotation $P_D$ with respect to each other, i.e. also in the same direction of rotation, during rotation of the drive shaft 52 in a direction of rotation indicated by arrow $P_D$ in FIG. 2.

In the illustrated example, two oscillation unbalance masses 66 or 68 having axial spacing to each other are provided on each oscillation shaft 36, 38. Preferably the oscillation unbalance masses 66 of the oscillation shaft 36 and the oscillation unbalance masses 68 of the oscillation shaft 38 are provided such that in association with the respective oscillation shaft 36 or 38 they generate the same unbalance, but have a phase shift to each other of 180° in the illustrated example. This can for example be achieved in that all unbalance masses 66, 68 are formed as identical to one another. In this manner it is ensured that during driving by the drive motor 50 the two oscillation shafts 36, 38 work in a substantially identical manner or even to a substantially identical degree, or work to generate a periodic oscillation movement caused by a torque which develops alternating in the circumferential direction about the compactor-roller axis of rotation $D_w$.

Each oscillation unbalance mass 66 or 68 comprises a base unbalance mass 72 fixed for example by a screw bolt 70 on the associated oscillation shaft 36 or 38. This base unbalance mass 72 can engage with a ring-type body region 74 of the associated oscillation shaft 36 or 38. The screw bolts 70 can be screwed in through the ring-type body region 74 and into the associated oscillation shaft 36 or 38. In general the base unbalance mass 72 is formed such that it provides a center of gravity which is eccentric compared to a respective oscillation-shaft axis of rotation $D_o$.

A variation unbalance mass is provided in association with the base unbalance mass 72. This is movably accommodated in principle in the circumferential direction about the oscillation-shaft axis of rotation $D_o$ in a movement chamber 78 formed for example on or in the base unbalance mass 72 and extending in an annular manner about the associated oscillation-shaft axis of rotation $D_o$. The chamber 78 is bounded in the circumferential direction on the two circumferential end regions by respective movement stops 80, 82 for the variation unbalance masses 76 accommodated therein. The variation unbalance mass 76 is supported here on that movement stop 80, 82 which follows the variation unbalance mass 76 in a respective rotation state. During turning in the direction of rotation $P_D$ indicated in FIG. 2, this is the movement stop 80, so that in this rotation state the variation unbalance mass 76 occupies the position illustrated as hatched. If the drive shaft 52 rotates in the opposing direction of rotation, the oscillation shafts 36, 38, and with them the base unbalance mass 72, thus also rotate in the opposing direction of rotation. The variation unbalance mass 76 respectively provided in association with a base unbalance mass 72 then occupies the position not shown with hatching in FIG. 2, wherein it is supported on the movement stop 82.

Due to the direction-of-rotation-dependent variability of the position of a respective variation unbalance mass 76 with respect to the associated base unbalance mass 72, it is possible to vary the position of the center of gravity of a respective oscillation unbalance mass 66 or 68 with respect to the axis of rotation $D_o$, which brings with it a corresponding change of the unbalance on the respective oscillation shaft 36 or 38. By choosing the direction of rotation of the oscillation shafts 36, 38 and the variation caused thereby of the unbalance of the respective oscillation unbalance masses 66 or 68, it is thus possible to change the oscillation behavior of the oscillation mass assembly 34 such that for example during turning in the direction of turning $P_D$ a preferred operation having an oscillation frequency of 30 Hz is made possible, while during turning in the opposing direction a preferred operation having an oscillation frequency in the range of 36 Hz is preferably made possible. This can also be accompanied by a variation in the achievable oscillation magnitude. The oscillation behavior of the oscillation mass assembly 34 can thus be optimally matched to different types of ground to be compacted.

In the compactor roller 10 recognizable in FIG. 1 a vibration mass assembly, generally indicated by 84, is further provided. This comprises a vibration shaft 86 disposed centrally in the compactor roller 10 which for example is rotatably carried with respect to the roller casing 11 in its two axial end regions via respective bearing assemblies 88. Carriers 42, 44, again recognizable in FIG. 1, can for example be used, on which the bearing assemblies 88 can be fastened, for example by screwing. It is also possible, for example, to rotatably support the vibration shaft 86 with respect to the output element 26 in its end region adjacent to the drive motor 22. Here the positioning is such that a vibration-shaft axis of rotation $D_v$ corresponds to the compactor-roller axis of rotation $D_w$.

A shaft drive 90 is associated with the vibration shaft 86. This comprises a drive motor 92 carried on the drive motor 22 for the compactor roller 10, the drive shaft 94 of the drive motor 92 extending coaxial to the compactor-roller axis of rotation $D_w$ through the drive motor 22 which is formed as a hollow motor. In its region protruding beyond the drive motor 22, the drive shaft 94 is connected to the vibration shaft 86, for example by screwing or clamping, so that they rotate together.

In the illustrated example two vibration unbalance masses 96 are provided on the vibration shaft 86 spaced axially with respect to each other. With respect to the general design these can be designed as described above with reference to the oscillation unbalance masses 66 and 68. This means the vibration unbalance masses 96 can also each be formed with a base unbalance mass to be fixed on the vibration shaft 86 and a variation unbalance mass which is movable in the circumferential direction between two stops with respect to this base unbalance mass. Depending on the direction of rotation of the drive shaft 94, the unbalance of the vibration mass assembly 84 can also be changed here in order to also be able to obtain a selection or matching of the vibration state to different ground types during the generation of vibrations, i.e. radial oscillations with respect to the compactor-roller axis of rotation $D_w$.

As indicated graphically in FIG. 1, the vibration unbalance masses 96 can differ from the oscillation unbalance masses 66 and 68 with respect to their size and thus with respect to the unbalance achieved thereby. Of course, in association with the vibration mass assembly 84 on the one hand and the oscillation mass assembly 34 on the other hand, another, in particular a different-to-one-another number of unbalance masses could be provided with the respective shafts. In this way as well, with the generation of the different oscillation states, i.e. an oscillation movement about the compactor-roller axis of rotation $D_w$ on the one hand and a vibration movement which is radial with respect to the compactor-roller axis of rotation $D_w$ on the other hand, an improved adaptability to compacting requirements to be fulfilled can be achieved. A forced coupling between the operating modes of oscillation and vibration is not indicated. In particular it is possible to operate the vibration mass assembly 84 and the oscillation mass assembly 34 independently of each other since a separate and also independently operable shaft drive 90 or 48 is associated with each of these two assemblies. Thus the oscillation mass assembly 34 can always be operated when this is required or advantageous; likewise with the vibration mass assembly 84. Of course a simultaneous operation of these two assemblies 34, 84 is also possible.

Since, like the drive motors 22, 24 for the compactor roller 10, the drive motors 50, 92 for the oscillation mass assembly 34 or the vibration mass assembly 84 are preferably formed as hydraulic motors, they can be easily integrated into the hydraulic circuit which is generally present in a soil compactor, so that it is likewise easily possible to put in operation or deactivate the drive motors 50, 92 with the respective desired rotational speed using corresponding controlling of hydraulic valves.

It should be noted that of course in the field of the oscillation mass assembly or/and the vibration mass assembly, in comparison to the illustrated exemplary design within the scope of the present invention, a wide variety of variations can be made. Thus in these formations the one or all unbalance masses need not necessarily be formed with the above-described variability. Fixed unbalance masses which are not changeable with regard to the positioning of their center of gravity with respect to a respective axis of rotation can in principle be used. The number and positioning of the unbalance masses on the respective shafts can also be chosen differently than illustrated. In addition, instead of the belt drive for the two oscillation shafts, a chain drive, a gear drive or similar could of course be chosen.

Figure 3:
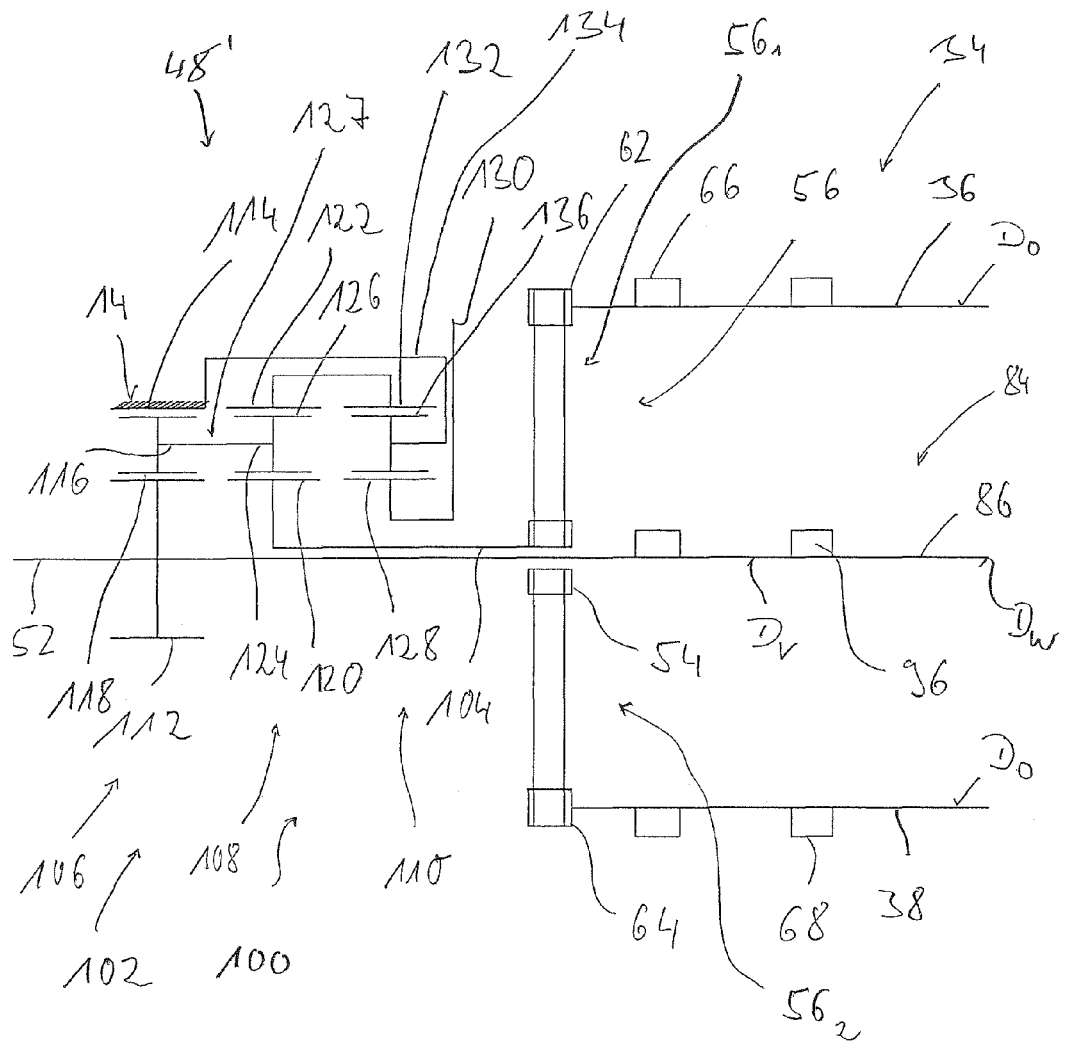
FIG. 3 shows a basic illustration of a transmission drive assembly for driving a vibration shaft and two oscillation shafts using a single drive motor.

In FIG. 3 a basic illustration of an alternative design of a shaft drive 48' is shown, using which both the two oscillation shafts 36, 38 and the vibration shaft 86 can be driven to rotate about their respective shaft axes of rotation $D_o$, $D_v$.

The shaft drive 48' comprises a transmission input shaft 52, which can be coupled to a drive shaft of a drive motor so that they rotate together, for example a drive shaft of the drive motor 50 described above with reference to FIG. 1, or it can also be provided by this drive shaft. The drive shaft 52 which preferably lies coaxial to the vibration shaft 86 and thus also to the compactor-roller axis of rotation $D_w$ (see FIG. 1) can be coupled thereto on its end region lying adjacent to the vibration shaft 86 for common rotation, for example by toothing which can be introduced axially one-into-the-other.

The shaft drive 48' comprises a transmission drive assembly, generally indicated by 100, whose drive shaft 52 on the one hand provides the transmission input shaft of a planetary transmission 102, and on the other hand, as already described, directly drives the vibration shaft 86. A transmission output shaft 104 of the planetary transmission 102 preferably lies coaxial to the transmission input shaft, i.e. to the drive shaft 52 and drives the two oscillation shafts 36, 38 to rotate via the drive disk formation 54 coupled therewith and the belt drive 56. It should be noted here that, similar to the design shown in FIG. 1, the belt drive 56 also has here a first belt drive 56$_1$ associated with the oscillation shaft 36 and a second belt drive 56$_2$ associated with the oscillation shaft 38. As shall be described below, the design here can be such that a rotational speed translation ratio of 2:1 is provided by relative dimensioning of the drive disk formation 54, which of course can comprise a separate drive disk or a separate drive disk region associated with each of the belt drives 56$_1$, 56$_2$, i.e. a rotational speed reduction is generated. It should further be noted at this point that the belt drive 56, i.e. the first or the second belt drive 56$_1$, 56$_2$ can be formed with one or more V-belts or toothed belts. The design of the belt drives 56$_1$, 56$_2$ as a chain drive is possible. In this case the drive disks or driven disks are formed as toothed disks and the belts respectively as chains.

The planetary transmission 102 comprises three axial, i.e. positioned consecutively in the direction of the compactor-roller axis of rotation $D_w$ planetary transmission units 106, 108, 110. The first planetary transmission unit 106 which is positioned nearest the drive motor comprises a first sun gear 112 fixed to the drive shaft 52, i.e. the transmission input shaft, so that they rotate together as well as a first ring gear 114. In principle said ring gear is held so that it does not rotate, i.e. does not rotate about the compactor-roller axis of rotation. For example the first ring gear 114 can be provided on or fixed on the carrier formation 14. The first planetary transmission unit 106 further comprises a first planetary gear 118 rotatably carried on a first planetary gear carrier 116. These are in comb engagement with both the first sun gear 112 and the first ring gear 114.

The second planetary transmission unit 108 comprises a sun gear 120 which is fixed to the transmission output shaft 104 so that they rotate together, as well as a second ring gear 122 which is in principle freely rotatable about the compactor-roller axis of rotation $D_w$. The second planetary transmission unit 108 further comprises a second planetary gear carrier 124 on which a plurality of second planetary gears 126 are rotatably carried distributed about the compactor-roller axis of rotation $D_w$.

It can be seen in FIG. 3 that the second planetary gear carrier 124 and the first planetary gear carrier 116 are provided by a common planetary gear carrier 127 of the two planetary transmission units 106, 108, whereby the torque-transmission connection between the transmission input shaft, i.e. the drive shaft 52, and the transmission output shaft 104 is provided.

The third planetary transmission unit 110 comprises a third sun gear 128. This is fixed to the compactor roller 10 so that they rotate together and can for example be provided on a disk-type carrier 130 which is fixedly connected to the roller casing so that the third sun gear 128 and the disk-type carrier 130 rotate together. The third sun gear 128 thus rotates together with the entire compactor roller 10 about the compactor-roller axis of rotation $D_w$. The third planetary transmission unit 110 further comprises a third ring gear 132 which is fixed to the second ring gear 122 so that they rotate together, and the third ring gear is thus in principle rotatable with the second ring year about the compactor roller axis of rotation $D_w$. The third planetary transmission unit 110 further comprises a third planetary gear carrier 134. Third planetary gears 136 are rotatably carried thereon, distributed in the circumferential direction about the compactor-roller axis of rotation $D_w$.

The third planetary gear carrier 134 is in principle fixedly disposed so that it does not rotate. For example it can also be carried on the carrier formation 14, so that it is also fixed so that it does not rotate with respect to the first ring gear 114.

The rotational movement of the drive shaft 52 is transmitted by the planetary transmission 102 to the transmission output shaft 104, and from this to the oscillation shafts 36, 38 via the belt drives 56$_1$, 56$_2$. If this torque transmission occurs in a state wherein the compactor roller 10 does not rotate about the compactor-roller axis of rotation $D_w$, the third sun gear 128 is fixed. Since the third planetary gear carrier 134 is also in principle held fixed so that it does not rotate, in this state also the third ring gear 132 and thus also the second ring gear 122 cannot rotate about the compactor-roller axis of rotation $D_w$. This means that during rotation of the drive shaft 52 and thus of the first sun gear 112, the first planetary gears 118 supported on the first ring gear 114 are moved in the circumferential direction about the compactor-roller axis of rotation $D_w$ and thus also move the common planetary gear carrier 127 in the circumferential direction. This in turn compels a rolling movement of the second planetary gears 126 on the second ring gear 122 which is held fixed in this state so that it does not rotate, whereby the second sun gear 120 is driven to rotate.

If, as is schematically indicated in FIG. 3, the two sun gears 112, 120 on the one hand and also the two ring gears 114, 122 on the other hand are identically dimensioned, which of course also respectively compels an identical dimensioning of the first planetary gears 118 and the second planetary gears 126 to one another, the rotational movement of the drive shaft 122 is transmitted to the transmission output shaft 104 without change to the rotational speed. This means that in this state the rotational speed translation ratio of the planetary transmission 102 is 1:1. Since, as described above, the rotational speed translation ratio of the belt drive 56$_1$ 56$_2$ is 2:1, the two oscillation shafts 36, 38 rotate with half the rotational speed of the drive shaft 52 and thus also half the rotational speed of the vibration shaft 86. Thus it is ensured that in this state, i.e. in the present base rotational speed translation ratio of the transmission drive assembly 100, two vibration periods of the vibration shaft 86 are generated with each oscillation period generated by the rotation of the oscillation shafts 36, 38, wherein respectively one vibration period for the back-movement of the oscillation and one for the forth-movement of the oscillation is generated.

If the compactor roller 10 rotates about the compactor-roller axis of rotation $D_W$ when the drive shaft 52 is not rotating, this occurs in a state wherein the first sun gear does not rotate with respect to the first ring gear 114, so that the first planetary gear carrier 116, and with it the second planetary gear carrier 124, are not moved about the compactor roller $D_W$. Since the third planetary gear carrier 134 is in principle held so that it does not rotate, the rotational movement of the sun gear 128 which is fixed to the compactor roller 10 so that it does not rotate relative thereto generates a rotational movement of the third planetary gear 136 about its own axis of rotation. This in turn generates a rotation of the third ring gear 132 about the compactor roller axis of rotation $D_W$ and thus also a corresponding rotation of the second ring gear 122. Since the second planetary gear carrier 124 cannot rotate about the compactor roller axis of rotation $D_W$, the rotation of the second ring gear 122 is converted to a rotation of the second planetary gear 126 about its own axis of rotation, which in turn generates a rotation of the second sun gear 120 and thus of the transmission output shaft 104.

If the third sun gear 128 and the second sun gear 120 on the one hand, as well as the third ring gear 132 and the second ring gear 122 on the other and are respectively dimensioned identical to one another here, which in turn compels an identical dimensioning of the third planetary gears 136 and the second planetary gears 126, the rotation of the compactor roller 10 and thus of the third sun gear 128 is transferred in a ratio of 1:1 to the transmission output shaft 104, which ultimately means that the transmission output shaft 104 rotates with the same rotational speed as the compactor roller 10. The direction of rotation of the transmission output shaft 104 of course depends on the direction of rotation of the compactor roller 10 itself, so that with a rotation direction reversal of the compactor roller 10 a corresponding rotation direction reversal of the transmission output shaft 104, and thus of the oscillation shafts 36, 38, is also generated.

If both the compactor roller 10 and the drive shaft 52 in the illustrated example rotate about the common axis of rotation $D_W$, this leads to a superposition of two rotational movements, namely on the one hand the rotational movement of the transmission output shaft 104 caused by the rotation of the drive shaft 52, and on the other hand the rotation of the transmission output shaft 104 caused by the rotation of the third sun gear 128, i.e. of the rotation of the compactor roller 10. Depending on the direction of rotation of the compactor roller about the compactor roller axis of rotation $D_W$ this superposition causes the rotational speed of the transmission output shaft 104 with respect to the rotational speed of the drive shaft 52, i.e. of the transmission input shaft, corresponding to the rotational speed of the compactor roller 10 to be increased or decreased. This in turn leads to a corresponding matching of the rotation speed of the oscillation shafts 36, 38 in the sense that the rotational speed ratio of the rotational speed of the oscillation shafts 36, 38 to the rotational speed of the vibration shaft 86 remains independent of the direction of rotation of the compactor roller on the one hand and also independent of the rotational speed, i.e. the RPM of the compactor roller 10 remains unchanged on the other hand. This means that the oscillation shafts 36, 38 can in principle always rotate with the rotational speed specified by the rotational speed translation behavior of the belt drives $56_1$, $56_2$ with respect to the rotational speed of the vibration shaft 86, in the present case with half the rotational speed.

Figure 4:
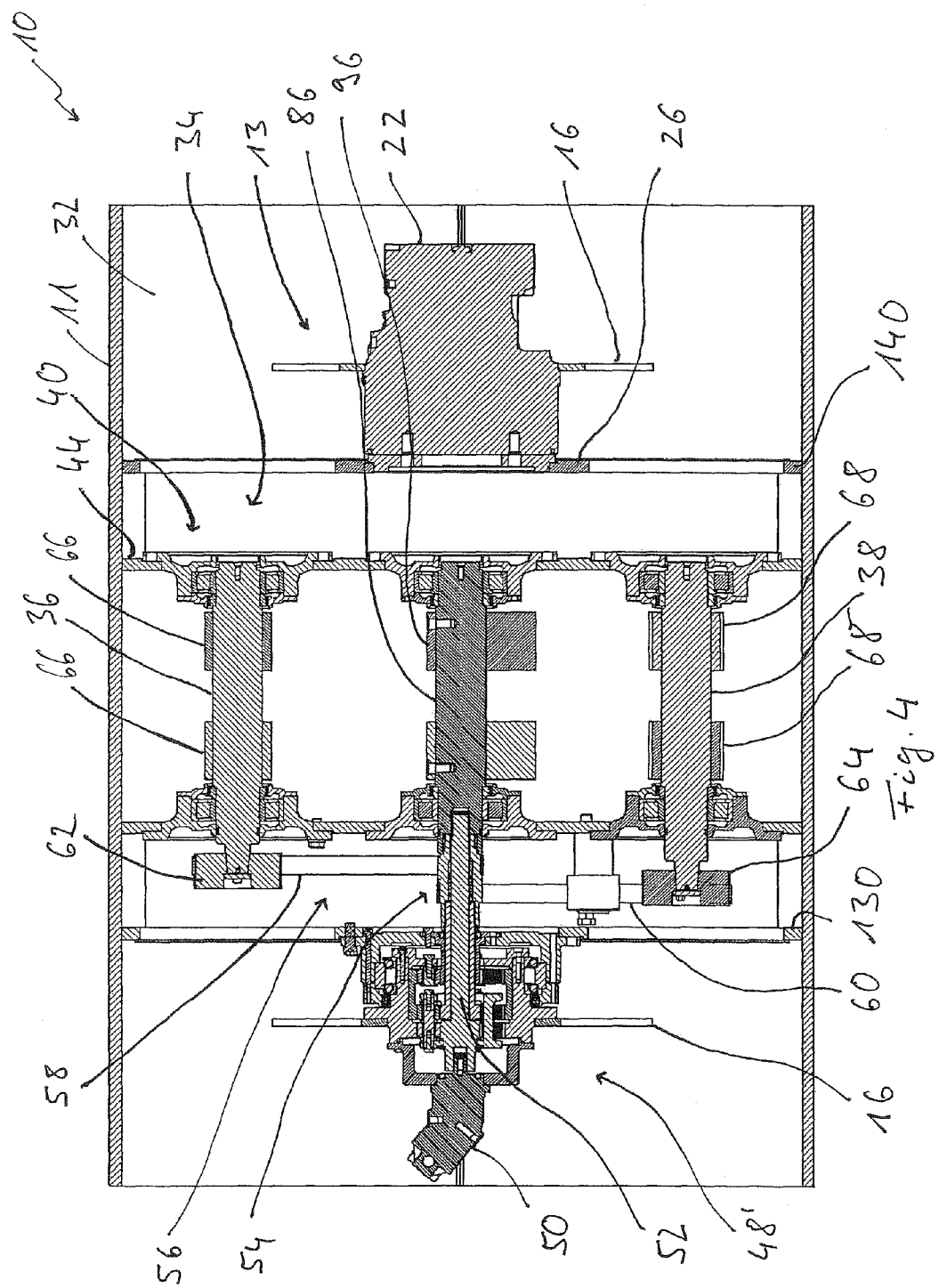
FIG. 4 shows a sectional view of a compactor roller including a transmission drive assembly according to FIG. 3.
Figure 5:
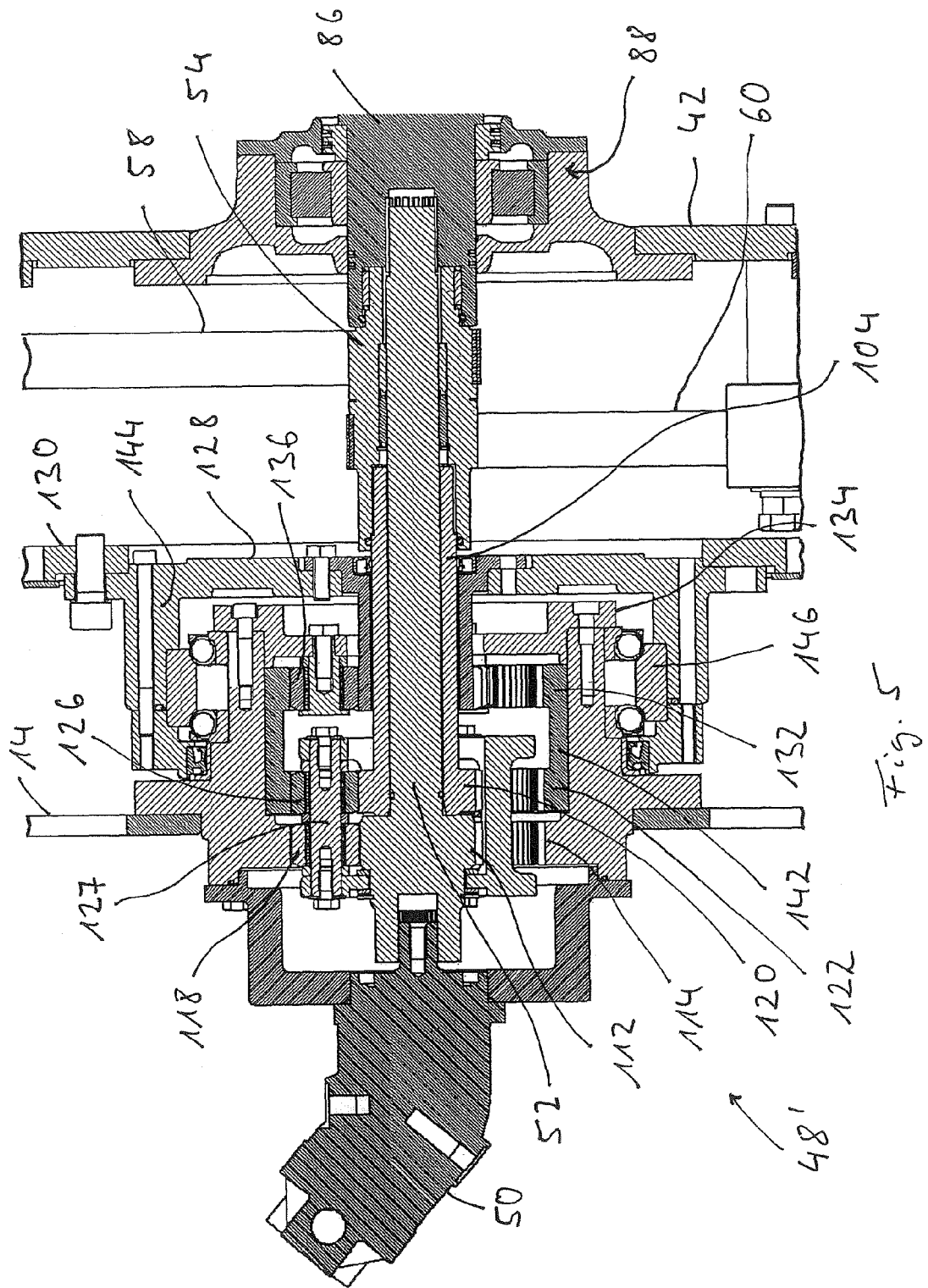
FIG. 5 shows a detail view of the transmission drive assembly of the compactor roller in FIG. 4.

A constructive embodiment of a compactor roller including a shaft drive 48' of this type for the oscillation shafts 36, 38 and the vibration shaft 86 is described below with reference to FIGS. 4 and 5. In FIG. 4 the compactor roller 10 having the roller casing 11 can be seen. The oscillation shafts 36, 38 and the vibration shaft 86 are rotatably carried on the disk-type carriers 42, 44. The output element 26 of the drive motor 22 engages a further disk-type carrier 140 which is positioned laterally outside the disk-type carrier 44, said drive motor driving the compactor roller 10 to turn about the compactor-roller axis of rotation $D_W$, said drive motor being, in this design example, the only drive for the compactor roller 10. The third sun gear 128, which is for example formed as multipart, is carried on the disk-type carrier 130 which is positioned laterally outside the disk-type carrier 42. The drive shaft 52 acting as drive input shaft is recognizable, said drive shaft being coupled for common rotation to the vibration shaft 86 by wedge toothing or similar in its end region lying axially distant from the drive motor 50. The drive shaft 52 is coaxially surrounded by the transmission output shaft 104. On its axial end region facing away from the drive motor 50 this is coupled for common rotation to the drive-disk assembly 54, possibly by wedge toothing or similar. In its edge region lying near the vibration shaft 86 this can be received in an axial opening thereof and radially supported thereon.

The first ring gear 114 is fixed on the carrier formation 14, for example by screwing. The third planetary gear carrier 134 is fixed on the first ring gear 114 on an axial end region facing away from the drive motor 50, for example by screwing, so that this is also fixed to rotate together with the carrier formation 14. The first sun gear 112 can be formed as an integral component of the drive shaft 52 and is in comb engagement with the first planetary gears 118. These in turn are rotatably carried, together with the second planetary gears 126, on the common planetary gear carrier 127.

The second sun gear 120 can be formed as an integral component of the transmission output shaft 104 which is formed as a hollow shaft. The second ring gear 122 and the third ring gear 132 can be formed as integral components of a common ring gear 142, so that these can be in comb engagement with the second planetary gears 126 on the one hand and the third planetary gears 136 on the other hand.

It is further recognized that the third sun gear 128 or a component thereof includes an axial bearing base 144 which is rotatably supported via a rolling-element bearing 146 on the outer circumference of the first planetary gear carrier 114 which is fixed on the carrier formation 14. In this manner the entire compactor roller 10 is rotatably supported in this region with respect to the carrier formation 14. A merging of functions is thus provided here, which contributes to a simple and compact construction.

The invention claimed is:

1. A compactor roller for a soil compactor, comprising:
    an oscillation mass assembly including at least one oscillation shaft which is rotatable about an oscillation-shaft axis of rotation which is eccentric to a compactor-roller axis of rotation, and including at least one oscillation unbalance mass and a vibration mass assembly including a vibration shaft rotatable about a vibration-shaft axis of rotation, which vibration mass assembly includes at least one vibration unbalance mass
    wherein at least one oscillation shaft and the vibration shaft are carried in the compactor roller such that they can be driven to rotate, and wherein a shaft drive is provided for driving at least one oscillation shaft to rotate about its oscillation-shaft axis of rotation, wherein the shaft drive comprises a drive motor and a transmission drive assembly, wherein a rotational speed translation ratio of the transmission drive assembly varies depending on a rotational speed of the compactor roller about the compactor-roller axis of rotation.

2. The compactor roller according to claim 1, wherein the vibration-shaft axis of rotation is substantially concentric with the compactor-roller axis of rotation, or/and that the oscillation-shaft axis of rotation of at least one oscillation shaft is substantially parallel to the vibration-shaft axis of rotation or/and to the compactor-roller axis of rotation.

3. The compactor roller according to claim 1, wherein when the compactor roller is not rotating about the compactor-roller axis of rotation, a rotational speed translation ratio of the transmission drive assembly is preferably 2:1.

4. The compactor roller according to claim 1, wherein during turning of the compactor roller in a first direction of rotation the rotational speed translation ratio of the transmission drive assembly is increased with respect to a base rotational speed translation ratio when the compactor roller is not rotating about the compactor-roller axis of rotation, and during turning of the compactor roller in a second direction of rotation opposed to the first direction of rotation, the rotational speed translation ratio of the transmission drive assembly is reduced with respect to the base rotational speed translation ratio.

5. The compactor roller according to claim 1, wherein the transmission drive assembly comprises a planetary transmission, preferably including three planetary transmission units, each including sun gear, ring gear, and planetary gears in comb engagement therewith on a planetary gear carrier, including a drive input shaft and a drive output shaft.

6. The compactor roller according to claim 5, wherein the transmission drive assembly comprises a belt drive in association with each oscillation shaft, which belt drive includes a drive disk drivable to rotate by a transmission output shaft and a driven disk driving the oscillation shaft to rotate, and at least one transmission belt, wherein preferably a rotational speed translation ratio of each belt drive is preferably 2:1.

7. The compactor roller according to claim 5, wherein a first planetary transmission unit of the planetary transmission comprises a first sun gear fixed to the transmission input shaft so that they rotate together, a first ring gear disposed rotationally fixed, and first planetary gears rotatably carried on a first planetary gear carrier.

8. The compactor roller according to claim 5, wherein a second planetary transmission unit of the planetary transmission comprises a second sun gear fixed to the transmission output shaft so that they rotate together, a second ring gear, and second planetary gears rotatably carried on a second planetary gear carrier.

9. The compactor roller according to claim 8, wherein the first planetary gear carrier and the second planetary gear carrier are provided by a common planetary gear carrier of the first planetary transmission unit and the second planetary transmission unit.

10. The compactor roller according to claim 5, wherein a third planetary transmission unit of the planetary transmission comprises a third sun gear fixed to the compactor roller so that they rotate together, a third ring gear, and third planetary gears rotatably carried on third planetary gear carrier disposed rotationally fixed.

11. The compactor roller according to claim 10, wherein the second ring gear and the third ring gear are fixed to each other so that they rotate together, or/and that the first ring gear and the third planetary gear carrier are fixed to each other so that they rotate together.

12. The compactor roller according to claim 5, wherein the transmission input shaft and the vibration shaft are coupled for common rotation, or/and that the transmission output shaft coaxially surrounds the transmission input shaft.

13. The compactor roller according to claim 1, wherein at least one oscillation shaft and the vibration shaft are drivable to rotate independently of each other.

14. The compactor roller according to claim 1, wherein two oscillation shafts are provided with an angular separation of approximately 180° with respect to the compactor-shaft axis of rotation.

15. The compactor roller according to claim 1, wherein at least one oscillation unbalance mass or/and at least one vibration unbalance mass have an unbalance which varies depending on the direction of rotation about the associated axis of rotation.

16. The compactor roller according to claim 15, wherein the at least one unbalance mass comprises a base unbalance mass carried on the associated shaft so that it rotates therewith and at least one variation unbalance mass which is relocatable in the circumferential direction about the associated axis of rotation in a limited angular range with respect to the base unbalance mass.

17. The compactor roller according to claim 16, wherein each oscillation unbalance mass or/and each vibration unbalance mass is formed with base unbalance mass and variation unbalance mass.

18. The soil compactor comprising at least one compactor roller according to claim 1, which compactor roller is rotatable about a compactor-roller axis of rotation.

19. The compactor roller according to claim 1, wherein a respective shaft drive is associated with at least one oscillation shaft and the vibration shaft.

20. The compactor roller according to claim 1, wherein the oscillation shafts are drivable to rotate in the same direction of rotation about their respective oscillation-shaft axes of rotation.

21. The compactor roller according to claim 15, wherein movement stops limiting the circumferential movement about the associated axis of rotation with respect to the base unbalance mass are associated with the at least one variation unbalance mass.

* * * * *